United States Patent
Jackowski et al.

(10) Patent No.: US 10,427,632 B2
(45) Date of Patent: Oct. 1, 2019

(54) BOWED ROTOR NACELLE COOLING

(71) Applicant: The Boeing Company, Chicago, IL (US)

(72) Inventors: Jason J. Jackowski, Everett, WA (US); Kent E. Karnofski, Lake Forest Park, WA (US); Frederick T. Calkins, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 218 days.

(21) Appl. No.: 15/475,987

(22) Filed: Mar. 31, 2017

(65) Prior Publication Data
US 2018/0283197 A1 Oct. 4, 2018

(51) Int. Cl.
F01D 25/26 (2006.01)
B60R 19/52 (2006.01)
F01D 25/14 (2006.01)
B64D 33/08 (2006.01)
B64D 33/02 (2006.01)

(52) U.S. Cl.
CPC .............. B60R 19/52 (2013.01); B64D 33/08 (2013.01); F01D 25/14 (2013.01); F01D 25/26 (2013.01); B60R 2019/527 (2013.01); B64D 2033/024 (2013.01); F05D 2300/505 (2013.01)

(58) Field of Classification Search
CPC ... B60R 19/52; B60R 2019/527; F01D 25/26; F01D 25/14; F05D 2300/505
USPC .................................................. 415/12, 108
See application file for complete search history.

(56) References Cited

U.S. PATENT DOCUMENTS

| 3,180,614 | A | 4/1965 | Ellenberger et al. | |
| 8,820,046 | B2 | 9/2014 | Ross et al. | |
| 2007/0171609 | A1* | 7/2007 | Kehl | H05K 7/20181 361/690 |
| 2013/0091850 | A1 | 4/2013 | Francisco | |
| 2014/0373553 | A1 | 12/2014 | Zaccaria et al. | |
| 2016/0348588 | A1 | 12/2016 | Ross et al. | |
| 2017/0082029 | A1 | 3/2017 | Zipperer | |
| 2018/0283199 | A1* | 10/2018 | Karnofski | F01D 19/00 |

(Continued)

FOREIGN PATENT DOCUMENTS

EP 1507068 2/2005
EP 2305986 4/2011

(Continued)

OTHER PUBLICATIONS

Extended European Search Report dated Jun. 4, 2018 for European Patent Application No. 18160131.1.

(Continued)

Primary Examiner — Hai H Huynh
(74) Attorney, Agent, or Firm — Gates & Cooper LLP

(57) ABSTRACT

The present disclosure describes ventilation systems having a reduced aerodynamic footprint. The vents in the ventilation systems are actuated with Shape Memory Alloys that actuate the vents on an as needed basis while effectively sealing the vents when not in operation. The present disclosure further describes a ventilation system in an aircraft nacelle that helps mitigate bowed rotors by cooling down the engine nacelle faster or by helping create a uniform temperature distribution in the nacelle. In various embodiments, the ventilation system comprises vents and fans embedded in the vents.

20 Claims, 18 Drawing Sheets

CONCEPT FOR COWL TO VENT ASSEMBLY INTERFACE

(56) References Cited

U.S. PATENT DOCUMENTS

2018/0283219 A1* 10/2018 Jackowski ............... H02N 2/10
2018/0283274 A1* 10/2018 Jackowski ................ F02K 3/06

FOREIGN PATENT DOCUMENTS

| | | |
|---|---|---|
| EP | 2554799 | 2/2013 |
| EP | 2602458 | 6/2013 |
| EP | 3051074 | 8/2016 |
| EP | 3211184 | 8/2017 |
| WO | 2013072291 | 5/2013 |

OTHER PUBLICATIONS

Extended European Search Report dated Oct. 10, 2018 for European Patent Application No. 18163383.5.

* cited by examiner

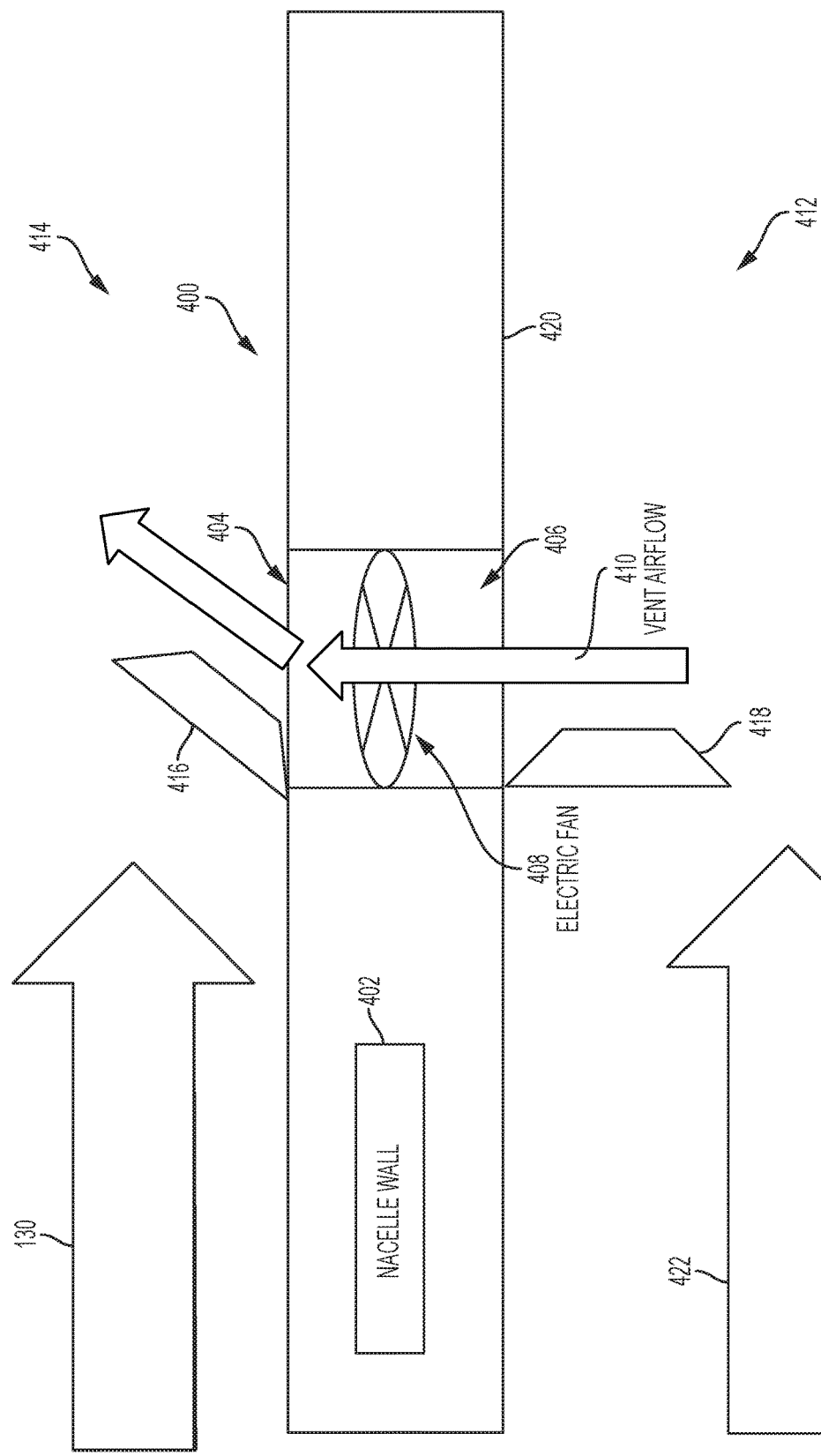

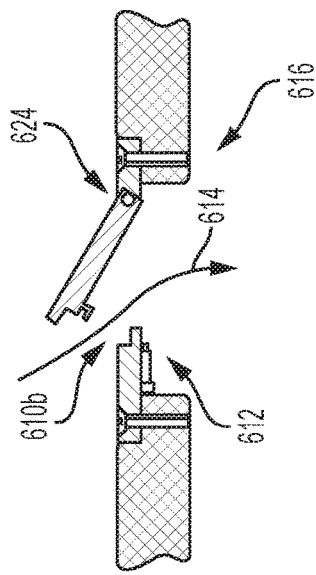
FIG. 6A
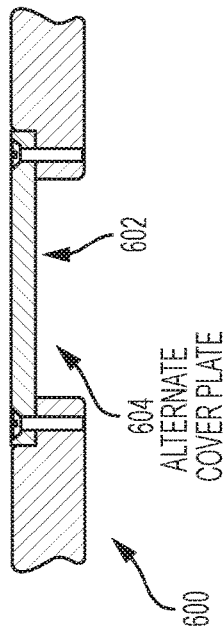
FIG. 6B
FIG. 6C
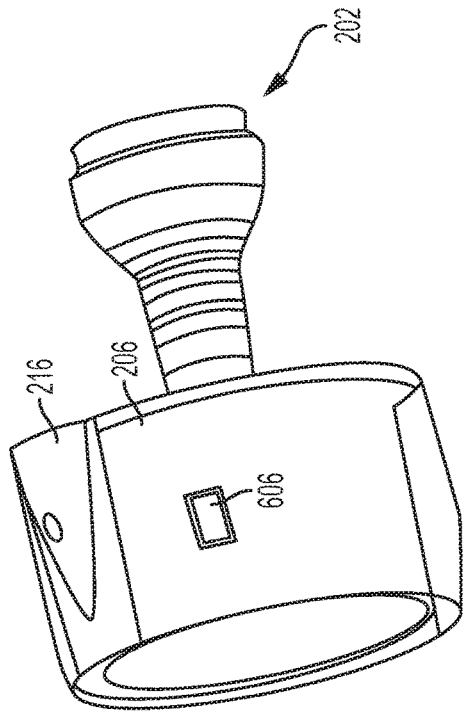
FIG. 6D
CONCEPT FOR COWL TO VENT ASSEMBLY INTERFACE

BOWED ROTOR NACELLE COOLING

BACKGROUND

1. Field

The present disclosure relates to ventilation systems for cooling portions of a vehicle.

2. Description of the Related Art

Device overheating may compromise device performance as well as cause safety hazards. In many cases, ventilation systems are used to reduce device heating. However, for many applications, conventional ventilation systems are problematic because they also harm device performance and/or allow toxic gases to escape. For example, vented battery containers may allow toxic gases from the battery to escape into the environment. Moreover, conventional automobile engine ventilation systems allow unnecessary amounts of air to enter the engine, thereby adding unwanted aerodynamic drag.

Increased aerodynamic drag is also the reason conventional ventilation systems are not used on aircraft aerodynamic surfaces. Non-ventilation based cooling systems are used instead, as further discussed below.

FIG. 1 illustrates an aircraft engine comprising a fan 100, a low pressure (LP) compressor 102, a fan case 104, an engine casing 106, a High Pressure (HP) compressor 108, a HP turbine 110, a LP turbine 112, and a LP shaft 114 connecting the LP compressor 102 and the LP turbine 112. After engine shutdown on the ground, residual hot air 116 in the engine core rises 118 and is trapped by the engine casing 106. As the hot air rises 118, the upper portion 120 of the HP compressor's (engine's rotor) 108 rotor shaft 122 becomes hotter than the lower portion 124 of the rotor shaft 122 and causes uneven cooling and thermal deformation of the engine rotor shaft 122 (i.e., rotor bowing, where the upper portion 120 of the rotor shaft 122 becomes longer than the lower portion 124). Upon engine restart (e.g., prior to fuel ignition in the combustor 126), even tiny fractions of rotor shaft bowing can cause the HP compressor (engine's rotor) 108 to rub against the engine's casing 106. The rub causes vibrations (manifested as disconcerting noise in the aircraft cabin) or even damage to the aircraft (e.g., engine damage, damage to the engine case lining, damage to the air pre-cooler used by the environmental control system, or damage to other accessories).

One method to mitigate these problems is to build the engine with wider cold build clearances ("opened up" clearances), so that the compressor rotor shaft 122 can bow without causing blades to rub on the engine casing 106. However, more advanced engine designs prefer less "gap" between the engine casing and the compressor rotors (tighter "cold build clearances") to reduce air leakage and improve thrust specific fuel consumption (TSFC). Thus, the overriding need to reduce fuel consumption renders wider cold build clearances less desirable. Indeed, as ever tighter cold build clearances are implemented, the problems caused by engine rub will become more severe.

Conceivably, an engine architecture could add rotor stiffening or bearing arrangements to reduce the amount of rotor shaft bow that is physically possible. However, these architecture changes would add weight and manufacturing cost to the engine.

Other methods of mitigating rotor shaft bow comprise rotating the shaft about longitudinal axis 128 (1) so that the shaft cools uniformly, returns to thermal equilibrium, and straightens, and/or (2) so that centrifugal forces straighten the bow. The shaft rotation is achieved (1) by motoring the engine at relatively low revolutions per minute (RPM) after starting the engine (but before running the engine at high RPM) and/or (2) using an Engine Turning Motor (ETM) to turn the rotor shaft when the engine is off.

However, conventional methods for providing power to the ETM or the engine so as to straighten the bow can be problematic. Some smaller aircraft, such as the Boeing 737 airplane, fly into remote airports where facility power is not available to power the ETM or engine. Furthermore, auxiliary power unit (APU) power on the aircraft is not always available to power the engine or ETM because some airports limit APU use at gates due to emissions and noise concerns and aircraft are not powered when they are towed between gates. In addition, airplanes may operate with a nonfunctional APU or the powering of the ETM or engine may cause undesirable APU wear (extended motoring prolongs the APU's exposure to main engine start (MES) mode, reducing APU life). Finally, the use of lithium-ion and nickel-cadmium batteries for powering the ETM is problematic due to high failure rates and flammability concerns associated with the engine environment (extreme heat, extreme cold, and high vibration).

Moreover, rotating the shaft shortly before departure causes departure delays, especially if reduced engine clearances require rotating the rotor at low speeds. These delays not only inconvenience the passengers but also increase costs associated with increased waiting times and parking fees.

What is needed then, are more efficient methods for mitigating heating effects that simplify ground logistics and/or that are less harmful to aerodynamic performance. The present disclosure satisfies this need.

SUMMARY

The present disclosure describes a more aerodynamic ventilation system comprising a housing; a vent disposed in the housing; and a shape-memory alloy (SMA) element coupled to the vent and configured such that when a temperature in the housing exceeds a threshold, the SMA element changes shape to actuate the vent. Air flows through the vent to cool an inside of the housing when the vent is actuated. Examples of housings include, but are not limited to, an engine pylon, an electronics and equipment bay on an aircraft, a battery container, or part in an automobile.

The present disclosure further describes a ventilation system for cooling an engine housing (e.g., nacelle) in combination with a gas turbine engine, so as to mitigate for rotor bowing of the rotor shaft in the gas turbine engine. The ventilation system comprises a plurality of vents disposed in the housing wall so that airflow through the vents reduces or prevents thermal bowing of the rotor shaft caused by a temperature gradient across the rotor shaft.

In various embodiments, one or more fans are attached to the wall and are coupled to at least one of the vents (e.g., a fan is disposed inside each of the vents). In various examples:

At least one of the fans is disposed to push air from inside the housing to outside the housing through at least one of the vents in an upper region of the housing; and at least one of the fans is disposed to flow cooler air from outside the housing to inside the housing through at least one of the vents in a lower region of the housing.

At least one of the fans is disposed to direct air from inside the housing to outside the housing through at least one of the vents in lower region of the housing; and at least one of the fans is disposed to direct cooler air from outside the housing to inside the housing through at least one of the vents in an upper region of the housing.

At least one of the fans is disposed to direct cooler air from outside the housing to inside the housing through all the vents and push hotter air out a rear of the gas turbine engine.

The fans are disposed to swirl the cooler air around the housing and push the hotter air out a rear of the engine.

One or more of the vents are disposed in an upper half of the housing and one or more of the vents are disposed in a lower half of the housing.

Barriers are provided to control airflow through the vents. In one embodiment, the barriers are pivotally attached to the wall so as to swing open or closed under gravity, thereby sealing or unsealing the vent. In another example, the barrier is pivotally attached to the wall so as to swing closed and seal the vent upon pressure from airflow outside the nacelle is moving above a threshold velocity. In yet another embodiment, the barrier comprises a shape-memory alloy (SMA) element.

BRIEF DESCRIPTION OF THE DRAWINGS

Referring now to the drawings in which like reference numbers represent corresponding parts throughout:

FIG. 4 illustrates an embodiment wherein a fan is coupled to a vent.

FIG. 6A illustrates vent assembly comprising a vent and cover plate.

FIG. 6B and FIG. 6C illustrates an embodiment wherein the ventilation system is a modular vent assembly apparatus using an SMA actuator.

FIG. 6D illustrates an example wherein the modular vent assembly unit mates or interfaces with the housing comprising a cowl in a nacelle in combination with a gas turbine engine.

DESCRIPTION

In the following description, reference is made to the accompanying drawings which form a part hereof, and which is shown, by way of illustration, several embodiments. It is understood that other embodiments may be utilized and structural changes may be made without departing from the scope of the present disclosure.

Technical Description

The present disclosure describes ventilation systems for redistributing trapped hot air in various vehicle housings, thereby cooling the contents of the housings.

First Example: Vents Disposed in a Nacelle

Figure 1:
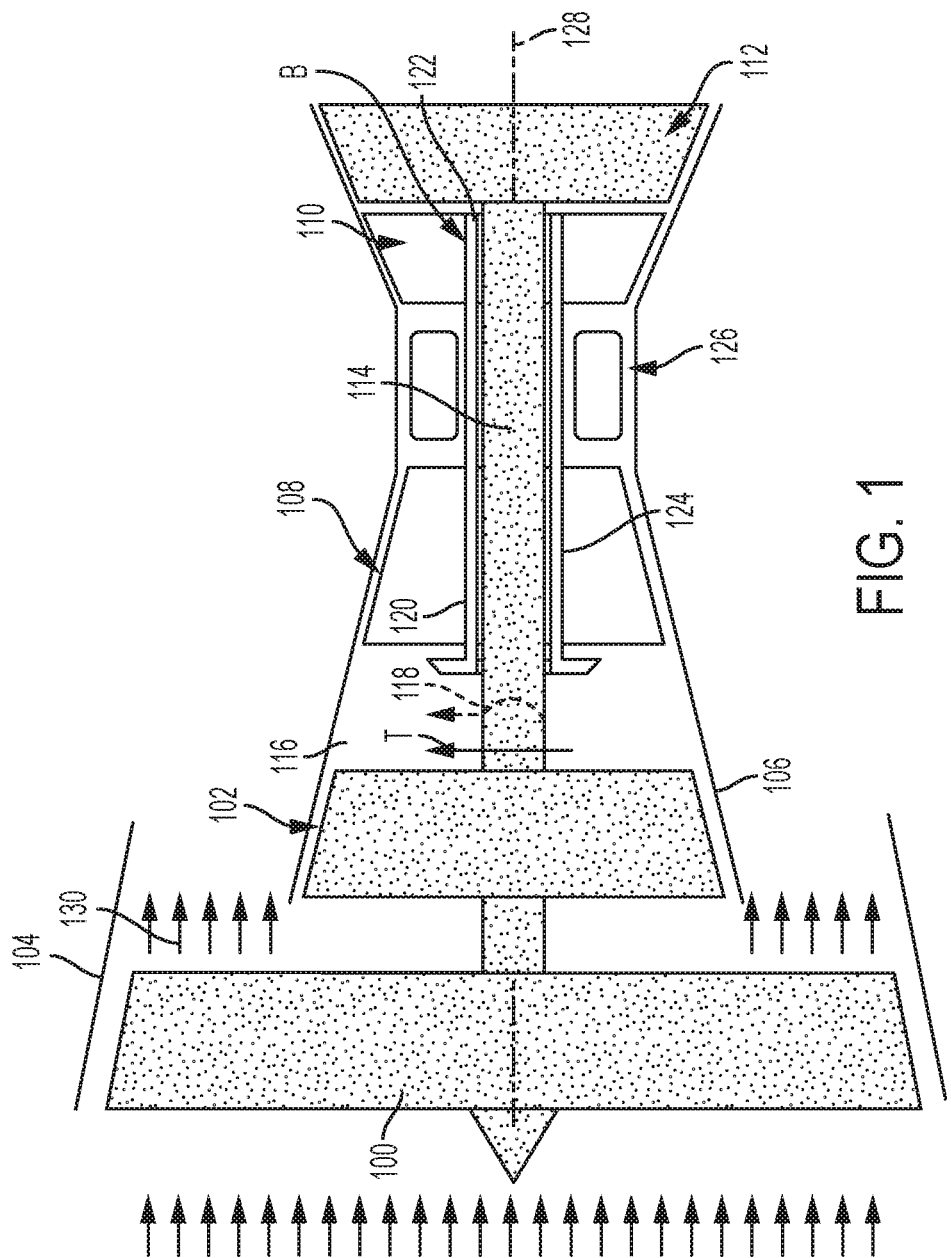
FIG. 1 is a schematic illustration of a gas turbine engine.
Figure 2A:
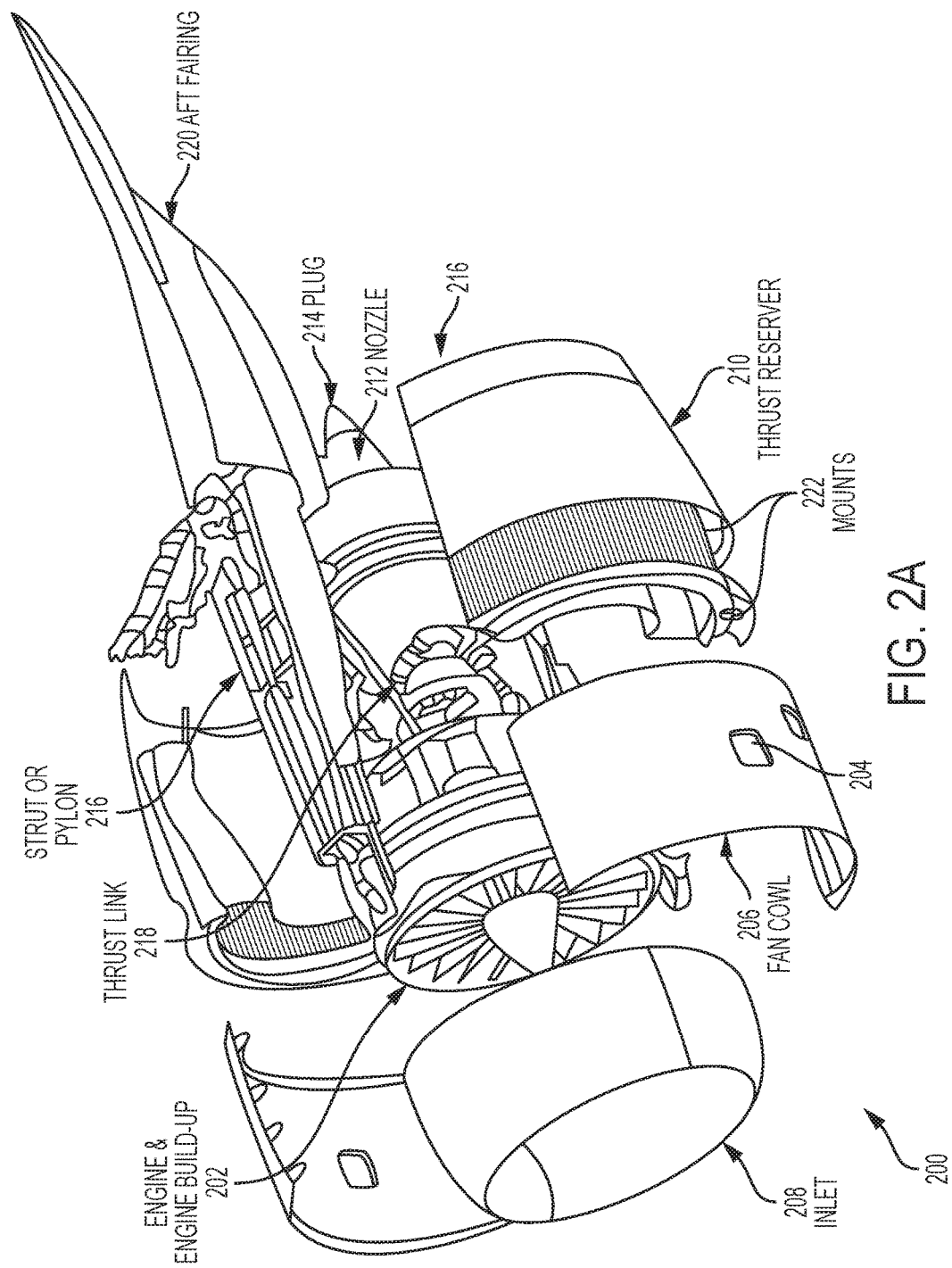
FIG. 2A illustrates a gas turbine engine in combination with a nacelle and an embodiment wherein vents are disposed in the nacelle.

FIG. 2A illustrates an engine housing comprising a nacelle 200 in combination with a gas turbine engine 202 and one or more vents 204 disposed in the nacelle 200. The nacelle 200 comprises fan cowl 206, inlet or intake 208, and thrust reverser 210 and the one or more vents 204 are disposed in the fan cowl 206.

FIG. 2A further illustrates the gas turbine engine 202 comprises a nozzle 212 and a plug 214. Also shown are a strut or pylon 216, thrust link 218 and aft fairing 220 connected to the gas turbine engine 202. The strut or pylon 216 connects the aircraft wing to the gas turbine engine 202 and typically houses electrical wiring between the gas turbine engine 202 and the rest of the aircraft. Mounts 222 are used to mount the nacelle 200 to the engine 202.

Figure 2B:
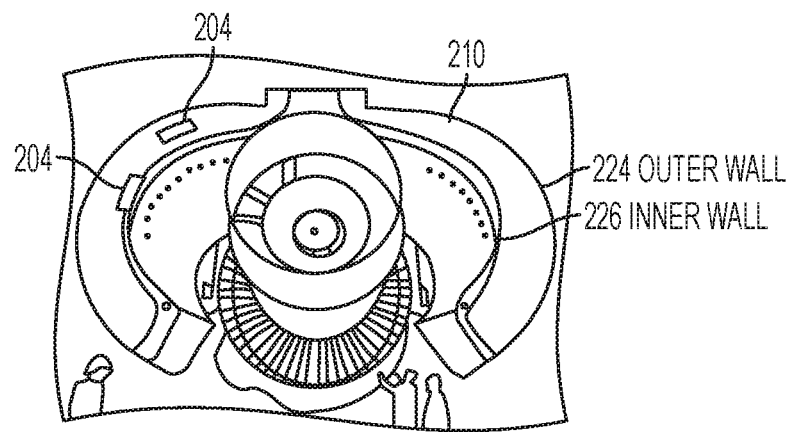
FIG. 2B illustrates an embodiments wherein the vents are in a thrust reverser.

FIG. 2B illustrates an embodiment wherein the vents 204 are in a thrust reverser 210 comprising an outer wall 224 and an inner wall 226. The thrust reverser 210 comprises doors having a fan air duct (a nozzle). The Vents 204 are either in the inner wall 224 or in the inner wall 224 and the outer wall 226.

Second Example: Vents Disposed in an Engine Casing

Figure 3:
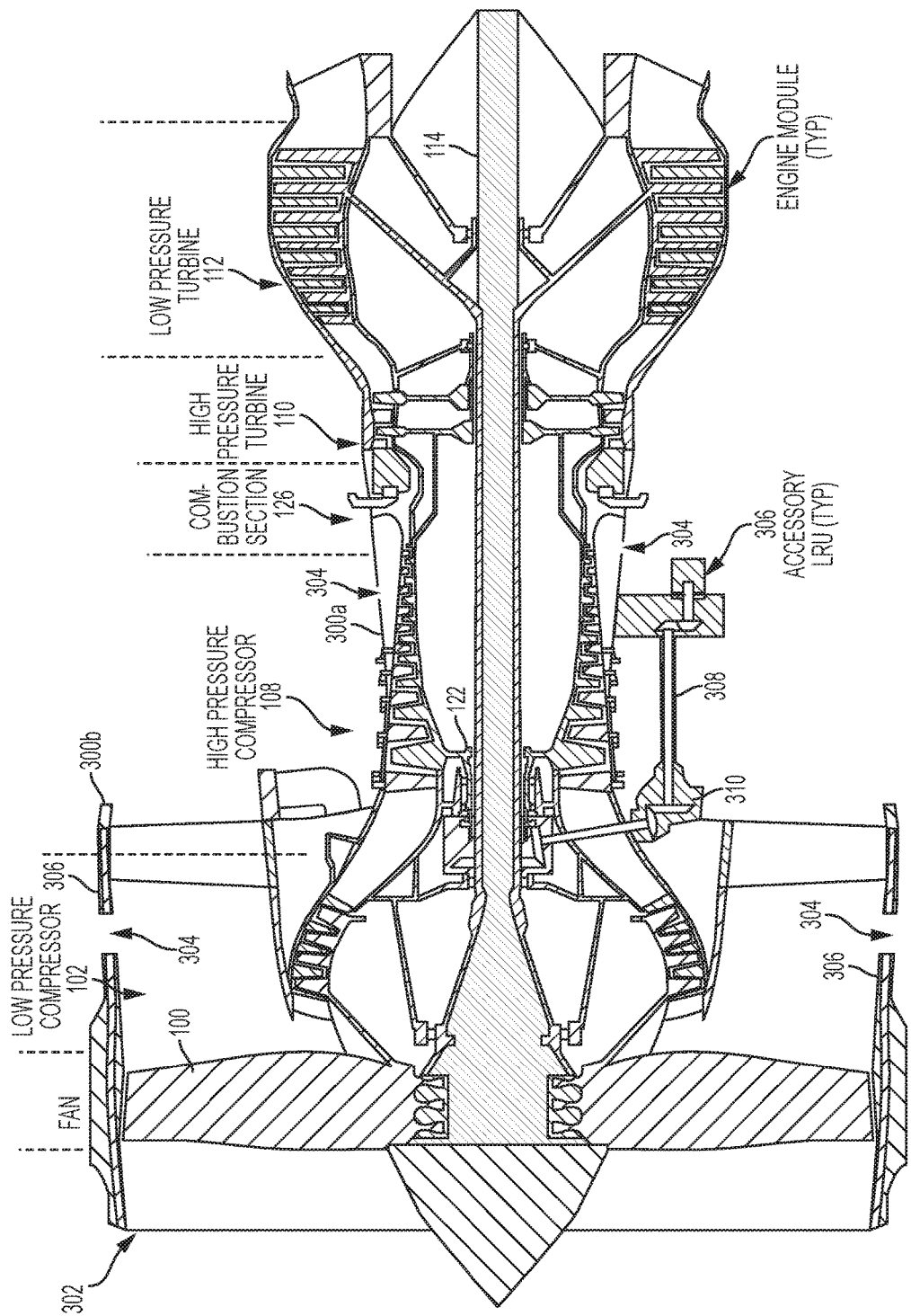
FIG. 3 illustrates a gas turbine engine in combination with an engine casing and fan casing, and the vents disposed in the engine casing and fan casing.

FIG. 3 illustrates an engine housing comprising engine casing 300a or fan casing 306b in combination with a gas turbine engine 302 and exemplary locations for one or more vents 304 disposed in the housing 300a, 300b. The low pressure shaft 114 (connecting the fan 100, the low pressure compressor 102, and the low pressure turbine 112) is within the high pressure shaft 122. Also shown is an auxiliary gearbox 306 connected to the low pressure shaft 114 and the high pressure shaft 122 via a drive shaft 308 and bevel gears 310.

Third Example: Coupling of Fans to the Vents

FIG. 4 illustrates a portion of an engine housing 400 (e.g., engine casing 300a, fan casing 300b, or nacelle 200) comprising a wall 402; a vent 404 comprising an opening 406 in the wall 402; and an electric fan 408 attached to the wall 402 and disposed in the opening 406 inside the vent 404. The fan 408 directs/encourages vent airflow 410 between the inside 412 of the casing 400 on one side of the housing wall 402 and the exterior 414 of the housing 400 on another side of the wall 402. FIG. 4 further illustrates a first barrier 416 and second barrier 418 pivotally attached to the wall 402 of housing 400 so as to swing open or closed and control airflow 410 through the vents. Examples of barriers 416, 418 include, but are not limited to, doors, dampers, baffles, or covers.

The wall 402 is a single wall of the engine housing 400 or one of multiple walls 224, 226 when the engine housing 400 comprises multiple walls. The fan cowl 206 typically has one wall whereas the thrust reverser 20 may comprise an inner wall 226 and outer wall 224. The vents 204 are in the inner wall 224 or in the outer wall 224 and the inner wall 226.

In one embodiment, one or more of the barriers 416, 418 are passive. For example, the first barrier 416 is opened by vent airflow 410 directed by the electric fan 408 and closes by dropping under gravity and/or when airflow 130 from the engine fan 100 (when the fan 100 is on) impinges on the barrier 416. The second barrier 418 on the outer surface 420 of the wall 402 is opened by gravity and closed by freestream airflow 422 impinging on the barrier 418 when the housing 400 (connected to an aircraft) is moving above a threshold speed.

In another embodiment, one or more of the barriers 416, 418 are driven, e.g., using an actuator such as a SMA (see Sixth Example). In one example, upon engine shutdown, a circuit applies current to the SMA so as to heat the SMA and drive the vents 416, 418 open, thus allowing air circulation. Upon engine start, the circuit shuts off the supply of current so that the SMA cools and the vents 416, 418 relax to their closed/sealed position.

Fourth Example: Arrangement of a Plurality of Vents on the Casing or Housing

FIGS. 5A-5F illustrate different configurations of vents 500 disposed in a housing wall 502a of an engine housing 502b (e.g., nacelle 200 or engine casing 300a or fan casing 300b). FIGS. 5A-5F are cross-sectional illustrations of the housing 502b as viewed along axis 128 of the rotor shaft 122. The ventilation system comprising a system of vents 500 allows hot air 116 to escape from the engine housing 502b so as to quicken engine 202 cooling and/or create or establish more even cooling of the engine's core.

Figure 5B:
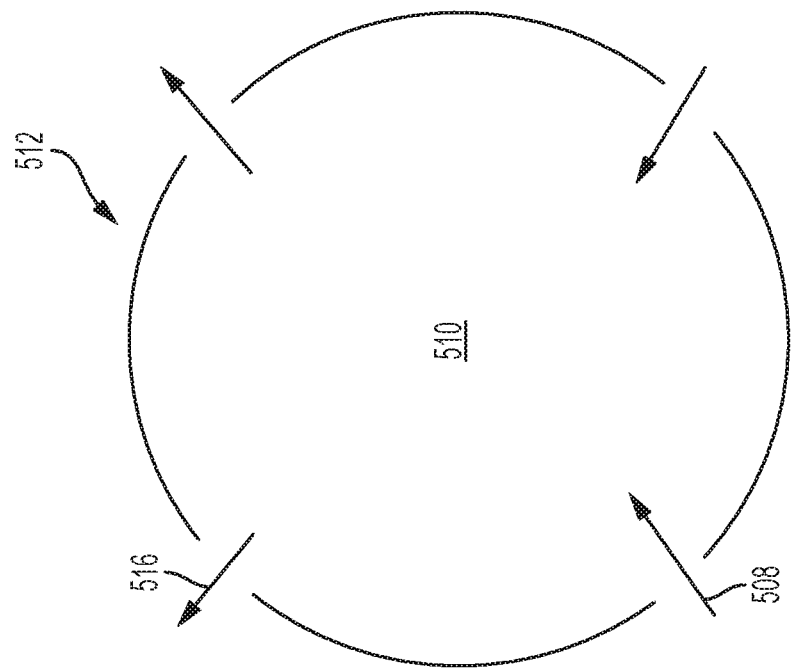
FIG. 5B illustrates an embodiment wherein the ventilation system introduces fresh air into a bottom of the nacelle and pushes hot air out a top of the nacelle.
Figure 5A:
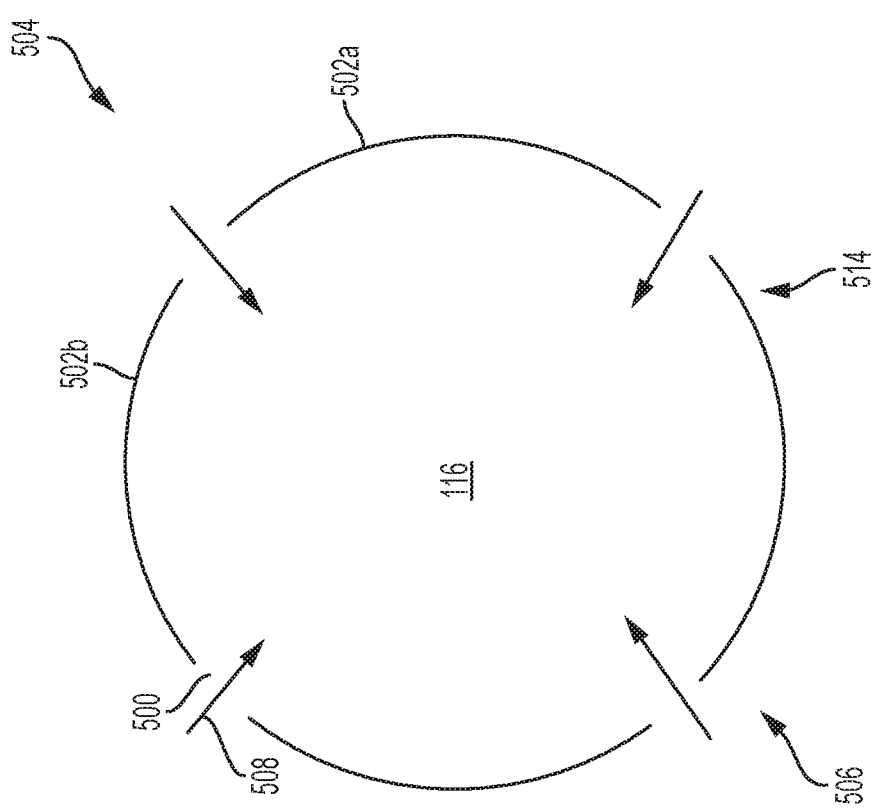
FIG. 5A illustrates an embodiment wherein the ventilation system introduces fresh air into the nacelle and pushes hot air out a back of the engine.

FIG. 5A illustrates the vents 500 disposed to allow cooler air 504 from outside 506 the housing 502b to flow 508 inside 510 the housing 502b. The cooler air 504 pushes hotter air 116 out a rear 216 of the gas turbine engine 202. In one embodiment, fans 408 are disposed to direct the flow 508 of the cooler air 504 (cooler than the hotter air 116) into the housing 502b through the vents 500.

FIG. 5B illustrates two vents 500 disposed in an upper region 512 (e.g., upper or top half) of the housing 502b so that hotter air 116 from inside 510 the housing 502b flows 508 outside 506 the housing 502b through the two vents 500. Two vents 500 are disposed in a lower region 514 (lower or bottom half) of the housing 502b so that cooler air 504 from outside 506 the housing 502b flows 508 inside 510 the housing 502b.

Figure 5D:
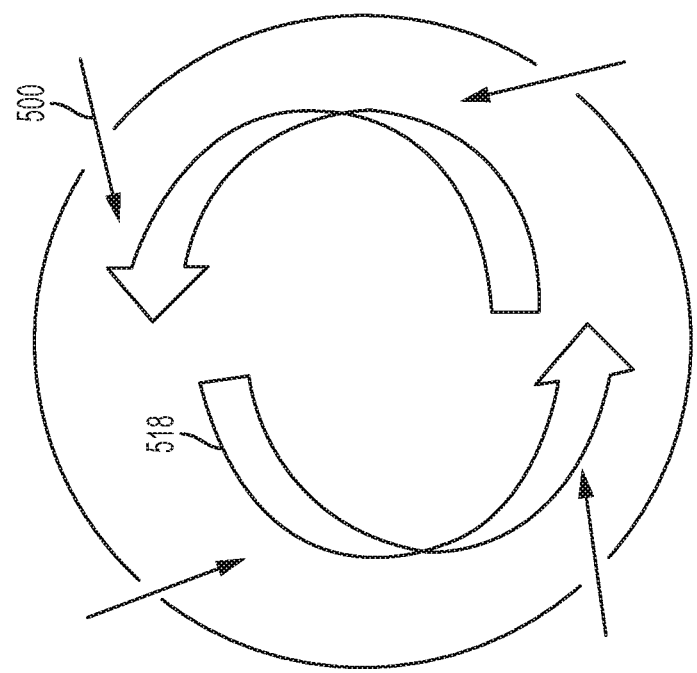
FIG. 5D illustrates an embodiment wherein the ventilation system introduces fresh air into the nacelle and swirls the fresh air around the nacelle.
Figure 5C:
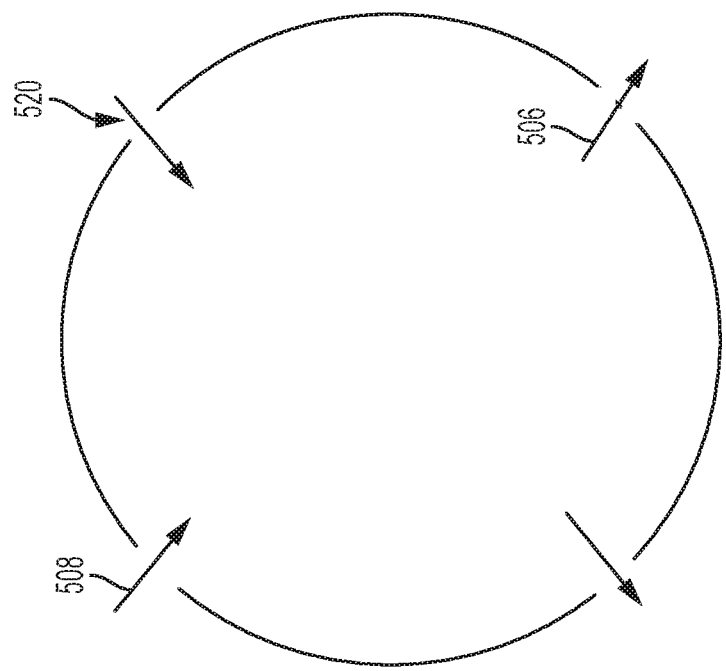
FIG. 5C illustrates an embodiment wherein the ventilation system introduces fresh air into a top of the nacelle and pushes hot air out a bottom of the nacelle.

FIG. 5C illustrates two vents 500 disposed in an upper region 512 (e.g., upper or top half) of the housing 502b so that cooler air 504 from outside 506 the housing 502b flows 508 inside the housing 502b through the two vents 500. Two vents 500 are disposed in a lower region 514 of the housing 502b so that hotter air 116 from inside 510 the housing 502b flows 516 outside 506 the housing 502b.

In one or more embodiments, one or more fans 408 are coupled to the vents 500 (e.g., attached to the wall (502a)) and are disposed to direct the flow 508 of the cooler air 504 from outside 506 the housing 502b into the housing 502b and/or the direct the flow 516 of the hotter air 116 from the inside 510 of the housing 502b to the outside 506 of the housing 502b.

In one or more embodiments, the flow 508 of the cooler air 504 into the housing 502b pushes the hotter air 116 out of the housing 502b.

FIG. 5D illustrates four vents 500 wherein the fans 408 are disposed to swirl 518 the cooler air 504 around the housing 502b and push the hotter air 116 out a rear 216 of the engine 202.

Figure 5F:
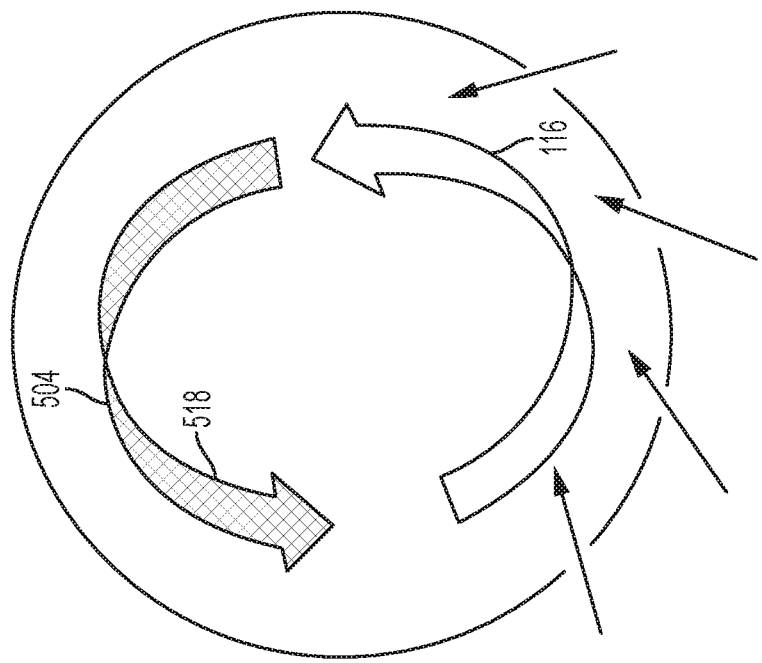
FIG. 5F illustrates an embodiment wherein the ventilation system introduces fresh air into a bottom the nacelle and swirls the fresh air and the hot air around the nacelle, according to one or more embodiments.
Figure 5E:
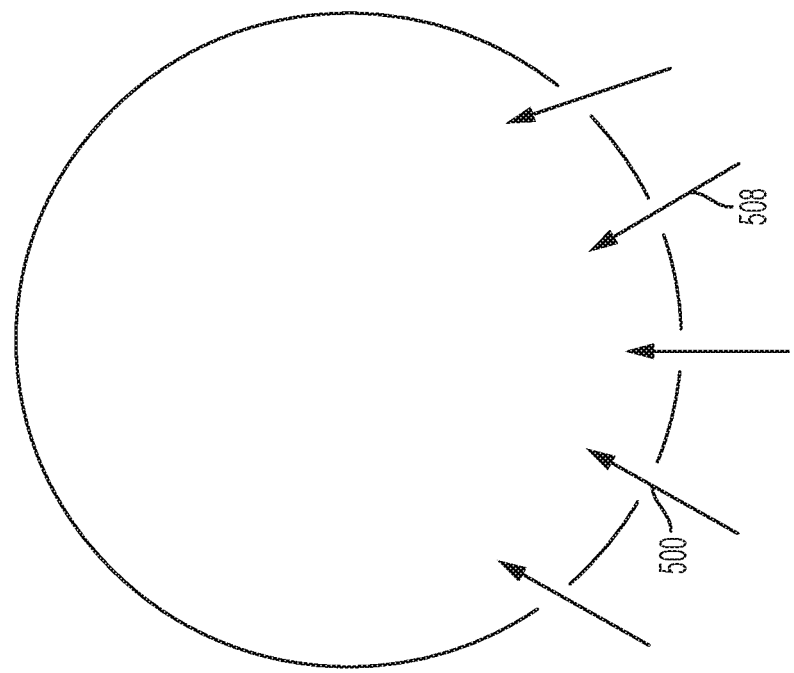
FIG. 5E illustrates an embodiment wherein the ventilation system introduces fresh air into a bottom of the nacelle and hot air is pushed out a rear of the engine.

FIG. 5E illustrates five vents 500 in a lower region 514 of the housing 502b disposed to allow flow 508 of fresh (e.g., cooler) air 504 into the housing 502b and push hotter air 116 out a rear 216 of the engine 202. In one embodiment, fans 408 are disposed to direct the flow 508 of the cooler air 504 into the housing 502b through the vents 500.

FIG. 5F illustrates four vents 500 in a lower region 114 of the housing 502b disposed to allow flow 508 of fresh air 504 into the housing 502b and swirl 518 and/or mix air 518b comprising the hotter air 116 and the fresher air 504 in the housing 502b. In one embodiment, fans 408 are disposed to direct the flow 508 so as to swirl 518 the hotter air 116 and the cooler air 504.

Thus FIG. 5A-5F illustrates various examples of a plurality of vents 500 disposed in the wall 502a so that airflow 508, 516 through the vents 204, 304, 500, 610a reduces or prevents thermal bowing of the rotor shaft 122 caused by a temperature gradient T across the rotor shaft 122.

Fifth Example: SMA Vent

FIG. 6A illustrates vent assembly 600 comprising a vent 602 and cover plate 604. In one or more embodiments, the cover plate 604 is substituted for the modular vent assembly unit 606.

FIG. 6B and FIG. 6C illustrate a modular vent assembly apparatus 606 comprising a housing 608a having a wall 608b; a vent 610a comprising an opening 610b disposed in the housing wall 608b; and a SMA actuator element 612 coupled to the vent 610a and configured such that when a temperature in the housing 608a exceeds a threshold, the SMA element 612 changes shape to actuate the vent 610a. Air flows 614 through the vent 610a to cool an inside 616 of the housing 608b when the vent 610a is actuated. A cover plate 618 for covering (closing) the vent 610a in the housing's wall 608b is provided. The cover plate 618 comprises the SMA actuator element 612 connecting a first plate member 620 and a second plate member 622. A hinge 624 with torsional spring connects the second plate member 622 to the housing wall 608b. Screws 626 fix the first plate member 622 to the housing wall 608b.

FIG. 6B illustrates that when the SMA actuator 612 is cold, the cover plate 618 covers the vent opening 610b so as to seal or close the vent 610a. FIG. 5C illustrates that when the actuator 612 is hot (i.e., due to the housing 608b exceeding a threshold temperature), the actuator 612 shrinks so as to release the second plate member 622 from the first plate member 620, allowing the hinge 624 to pivot the second plate member 622 and open the vent 610b.

The SMA vent 606 may be used in many applications in aerospace, automotive, down-hole, power grids, etc.

a. Engine Housing

FIG. 6D illustrates an example wherein the vent 204 is the modular vent assembly unit 606 mating or interfacing with the housing 608a comprising a cowl 206 (in the nacelle 200), wherein the housing 608a is in combination with a gas turbine engine 202.

b. Engine Pylon

Figure 6E:
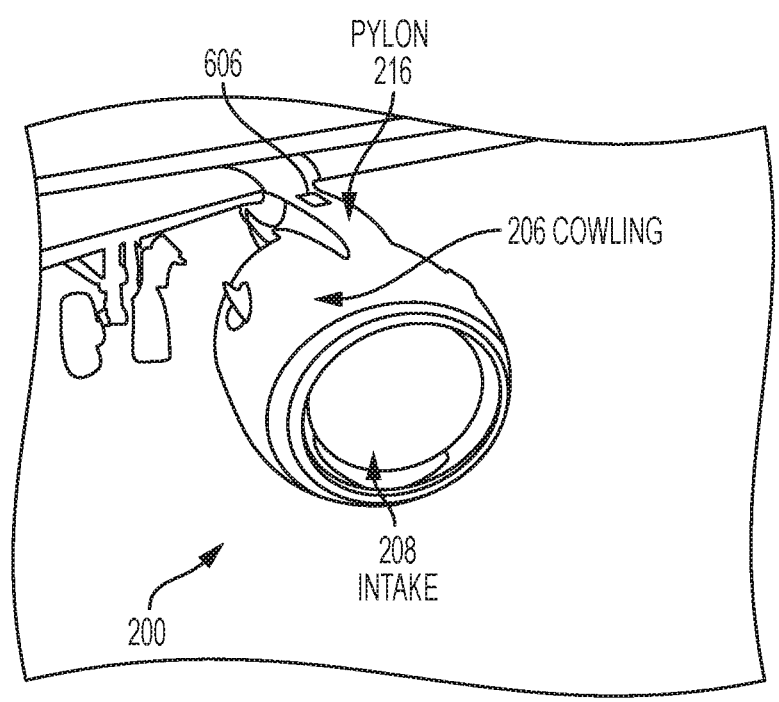
FIG. 6E illustrates an example wherein the housing is an engine pylon.

FIG. 6E illustrates an example wherein the housing 608a is an engine pylon 216. The pylon 216 may become hot due to rising engine heat, particularly in hot-weather engine ground runs. However, systems routed through or housed in the pylon typically have heat restrictions. The SMA vent 606 cools the pylon 216 so as to prevent overheating of systems routed through and/or housed in the pylon. Examples of systems housed in the pylon include, but are not limited to, a software-based LRU ("MEDC").

c. Electronics and Equipment Bay

Figure 6F:
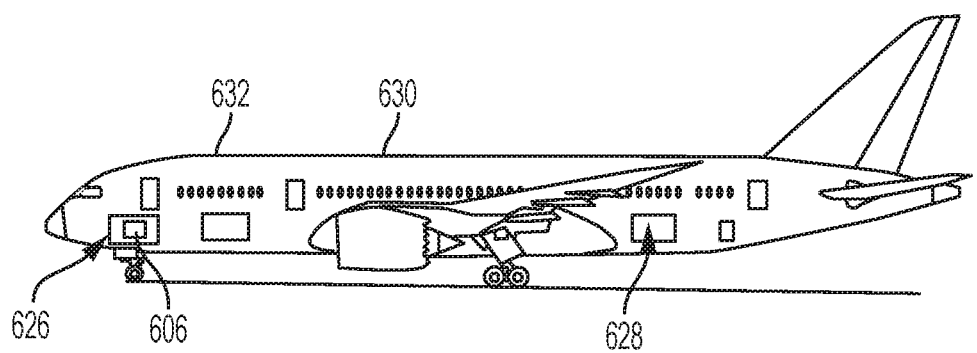
FIG. 6F illustrates an example wherein the housing is an electronics and equipment (E&E) bay.

FIG. 6F illustrates an example wherein the housing 608a is an electronics and equipment (E&E) bay 626, 628. Large civil transport aircraft 630 typically have a first E&E bay 626 underneath the cockpit and/or a second E&E bay 626 in the aft section of the cargo hold. The E&E bays 626, 628 contain racks of software-based LRUs, power distribution panels, and other electronics equipment. Many of these electrical systems will shut down upon loss of cooling or will run until failure (flight controls in particular have arduous design and test requirements to continue operation without the cooling system). Thus, an onerous technical hurdle to housing engine control software in the E&E Bay is accommodating loss of cooling systems because the Electronic Engine Controls providing cooling are typically currently installed on the engine fan case. The SMA-based vent 606 is actuated upon high temperature excursions, in conjunction with a system of cover plates 618 acting as baffles, allows ambient cooling air into the E&E bay while maintaining cabin pressurization. This is particularly useful for cooling propulsion and flight control systems. Moreover, the vent 610a may be disposed in the housing 608a on an aerodynamic surface of the fuselage 632.

d. Battery Container

Figure 6G:
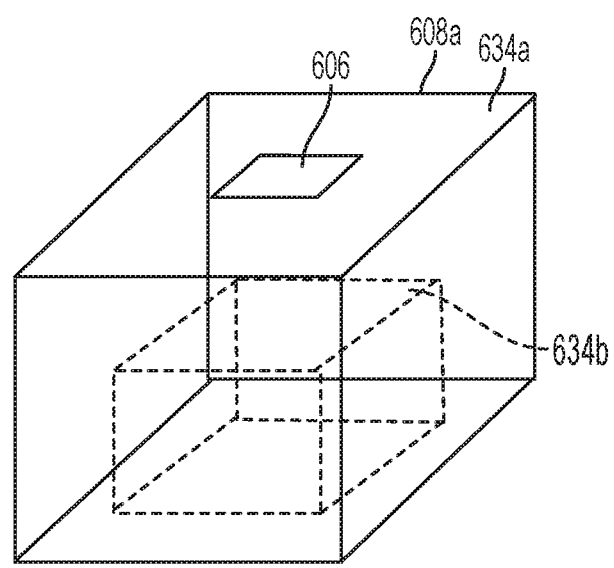
FIG. 6G illustrates an example wherein the housing is a battery container.

FIG. 6G illustrates an example wherein the housing 608a is a battery container 634a (e.g., a steel box) containing a battery 634b. Many batteries (e.g., lithium ion batteries) catch fire upon overheating. A heat-activated SMA vent 606 disposed in the container wall is a simple, light-weight solution to the battery venting problem. The vent 610a allows cooling air 614 into the container 634a when the container 634a (and the actuator 612) reach a threshold temperature, thereby preventing overheating of the battery 634b. In one embodiment, gases from the electrolyte mixture emanating from a cell rupture are also vented through the SMA vent 610a and through a tube to the exterior of the vehicle (e.g., aircraft, if the battery is located on an aircraft).

e. Automobile Engine Cover/Grille

Figure 6H:
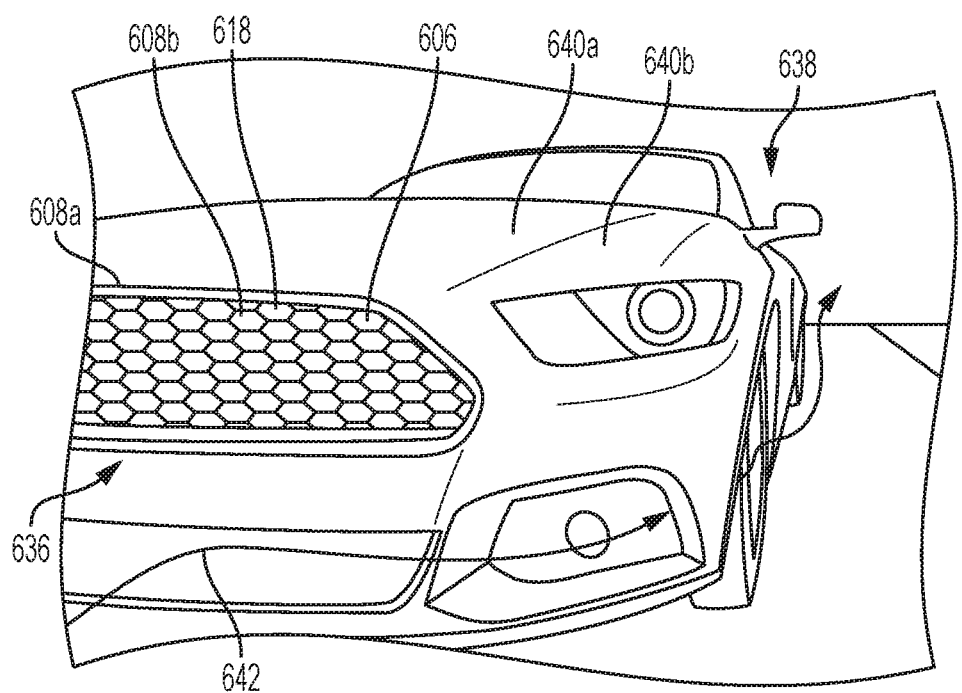
FIG. 6H illustrates an example wherein the housing is a part that covers an automobile engine.

FIG. 6H illustrates an example wherein the housing 608a is an engine grille 636 in an automobile 638 and covering a portion of the automobile engine 640a. Unless the car engine is working extremely hard, or is in a hot climate, conventional vents often allow more air entering the engine bay than is needed to keep the engine cool. The unnecessary air entering the engine bay can add significant aerodynamic drag to the car, increasing the amount of energy needed to move the car along and thus decreasing gas mileage. The active radiator grille 636 illustrated in FIG. 6H comprises SMA vents 606 that shutter the flow of air 614 so as to more optimally control the flow of air 614 into the engine bay 640b. The vents 610a only open to allow air 614 into the engine bay 640 when the temperature of the SMA actuators 612 reach a threshold temperature. Otherwise, the vents 610a remain closed and direct air 642 around the engine bay 640b to reduce aerodynamic drag.

Process Steps

Fabrication

Figure 7:
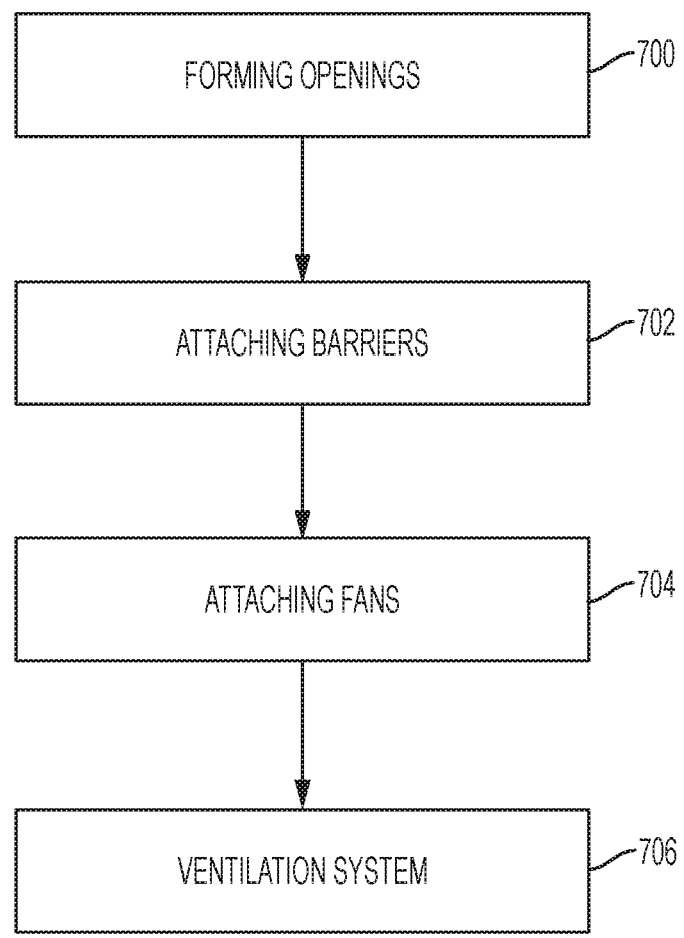
FIG. 7 is a flowchart illustrating a method of fabricating a ventilation system.

FIG. 7 is a flowchart illustrating a method of fabricating a ventilation system.

Block 700 represents forming one or openings 610b, 406 in a housing 608a, 400. In one embodiment, the step comprises cutting one or more openings 610b, 406 in the housing wall 602b, 402. Examples of opening 610b, 406 dimensions include, but are not limited to, the openings 610b, 406 having surface area in a range of 1 inch by 1 inch to a surface area of 1 foot by 1 foot. Examples of housings 608a include, but are not limited to, engine casings 300a, fan casings 300b, engine nacelles 200, aircraft electronics and equipment bays 626, battery containers 608b, and car engine bays 640.

Block 702 represents attaching one or more barriers 416, 418 to the housing 200, 300, 626, 608b, 640 so as to cover each of the one or more openings 610b, 406.

In one or more embodiments, the barriers 418, 416, 618 are pivotally attached to the wall 402, 602b so as to swing closed and seal each the vents 204, 304, 500, 610a. In or more embodiments, the barriers 418, 416, 618 swing closed upon pressure from airflow 130, 422 outside 506 the engine housing when the airflow 130, 422 is moving above a threshold velocity. The airflow may comprise fan flow 130 from fan 100 and/or freestream flow 422 when the aircraft is moving. In one or more embodiments, the barriers 418, 416, 618 open or close under gravity so as to seal or unseal each the vents 204, 304, 500, 610a. In yet further embodiments the barriers 418, 416, 618 comprise a shape-memory alloy (SMA) element 612 that changes shape to open the vent 204, 304, 500, 610a when the housing and SMA 612 reach a threshold temperature.

In one or more embodiments, the barriers 418, 416, 618 are designed to:
- adequately seal the openings 610b, 406 in the vents 204, 610a, 500 when the vents are not in operation, so as to prevent leaking effecting loss of thrust, TSFC efficiency, thermal efficiency, and prevent fire hazards;
- have improved reliability (reduce maintenance/repairs that would prevent dispatch of the aircraft); and/or
- reduce weight added to the ventilation system.

Passive vent doors 416, 418 and/or SMA actuated doors 618 may satisfy one or more of the above described sealing, reliability, and weight requirements. In particular, some SMA actuators 612 have much longer lifetime (so called 'infinite life') as compared to non-SMA actuators because the maintenance is on the actuation control electronics (whereas conventional non-SMA actuators require maintenance on both the mechanical device and the control system). Moreover, SMA actuators 612 are less susceptible to becoming stuck or failing due to blockages or rusting.

In one or more embodiments, the SMA actuators 612 comprise/consist essentially of an alloy of Nickel and Titanium, or an alloy of Nickel, Titanium, and Hafnium.

In one or more embodiments, the SMA actuator 612 is trained to open when the threshold temperatures are exceeded and close when the temperature falls sufficiently below the threshold temperature. The training comprises repetitively cycling the SMA actuator 612 between a first shape 644 that opens the vent 610a (e.g., as shown in FIG.

6C) and a second shape 646 that closes the vent 610b (e.g., as shown in FIG. 6B), by deforming the SMA actuator 612 to the open shape 644 at the hotter temperature above the threshold temperature and deforming the SMA actuator 612 to the closed shape 646 at the colder temperature sufficiently below the threshold temperature. In one or more examples, the threshold temperature includes, but is not limited to, a temperature in a range of 300-500 degrees Celsius.

Block 704 represents attaching one or fans 408 to the housing 400, 608a. In one or more embodiments, the fans 408 are selected for reduced weight and size (e.g., smaller weight and size as compared to an engine turning motor). In one or more embodiments, the fans are electrically powered fans 408.

Block 706 represents the end result, an apparatus 600, 200 comprising a system of vents 204, 610a, 500 spatially integrated with a housing 400, 502b.

In one or more embodiments, positioning of the vents 204, 610a, 500 and/or fans 408 and selection of the system of barriers 416, 618, are determined using thermal analysis and modeling so as to promote uniform cooling of the rotor shaft 122 while increasing integration of the system of vents 204, 610a, 500 in the housing 400, 502b so as to minimize impact on engine 202 performance. The vents 204 in the housing 502b (e.g. nacelle 200) may open when the airplane is on the ground and can help cool the housing 502b faster and/or help mix the air to provide a more uniform temperature distribution that prevents the engine rotor shaft 122 from bowing. Conventional engine turning motors used to correct rotor bowing are large and can be difficult to spatially integrate in the engine nacelle package. The system of vents 204, 610a, 500 described herein, on the other hand, provide improved spatial integration and reduced weight as compared to conventional engine turning motors used for rotor bow mitigation.

Operation

Figure 8:
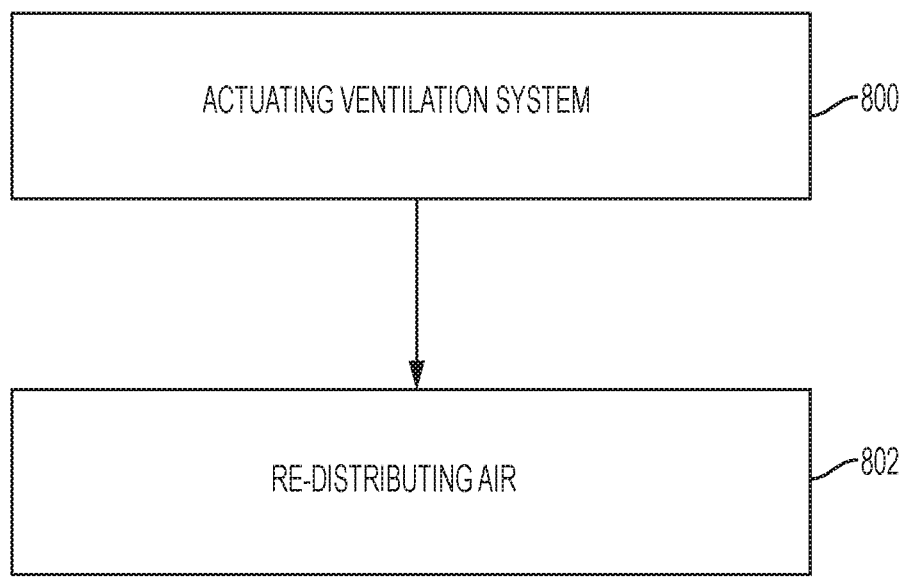
FIG. 8 is a flowchart illustrating a method of operating a ventilation system.

FIG. 8 is a flowchart illustrating a method of cooling a rotor shaft 122 in an engine housing 400 of an aircraft engine assembly 202.

Block 800 represents actuating a system of vents 204, 610a, 500 in the engine housing 400, 502b, 200. The system of vents 204, 610a, 500 comprises ventilation ducts 520 or openings 610b, 406 in the housing wall 402. In one or more embodiments, the ducts 520 are coupled to fans 408.

Block 802 represents re-distributing or circulating air 116 trapped in the housing 400, 502b, 200, when the rotor shaft 122 is cooling down in a temperature gradient T perpendicular to a longitudinal axis 128 of the rotor shaft 122, thereby reducing or preventing any thermal bowing of the rotor shaft 122 in the temperature gradient T. Examples of the redistributing include, but are not limited to, the following:

(1) allowing/introducing flow 508 of cooler air 504 into a bottom 514 of the housing 502b through at least one of the ducts 520 and expelling 516 hot air 116 out of the top 512 of the housing 502b through at least one of the ducts 520;

(2) introducing/allowing flow 508 of cooler air 504 into a top 512 of the housing 502b through at least one of the ducts 520 and expelling 516 hot air 116 through out of a bottom 514 of the housing 502b through at least one of the ducts 520;

(3) using the ducts 520 to swirl 518 cooler air 504 around the housing 502b and push hot air 116 out a rear 216 of aircraft engine assembly 202; and (4) allowing flow 508 of cooler air 504 into the housing 502b through all the ducts 520 so as to push hot air 116 out a rear 216 of the aircraft engine assembly 202.

In one or more embodiments, the re-distributing examples 1-4 further comprise activating the fans 408 attached to the housing 400 so as to push or suck, or otherwise encourage air through the ventilation ducts 520. The fans 408 may create convection of the trapped air 116 and/or swirl 518 the air so as to subject the engine compressor/rotor 108 and shaft 122 to a uniform temperature.

In one or more embodiments, the redistributing establishes more uniform temperatures in the engine nacelle 200 that promote symmetric thermal deformation of the engine rotor shaft 122. In one or more embodiments, the rotor shaft 122 does not need to cool down faster, rather the rotor shaft 122 just needs to cool symmetrically.

Processing Environment

Figure 9:
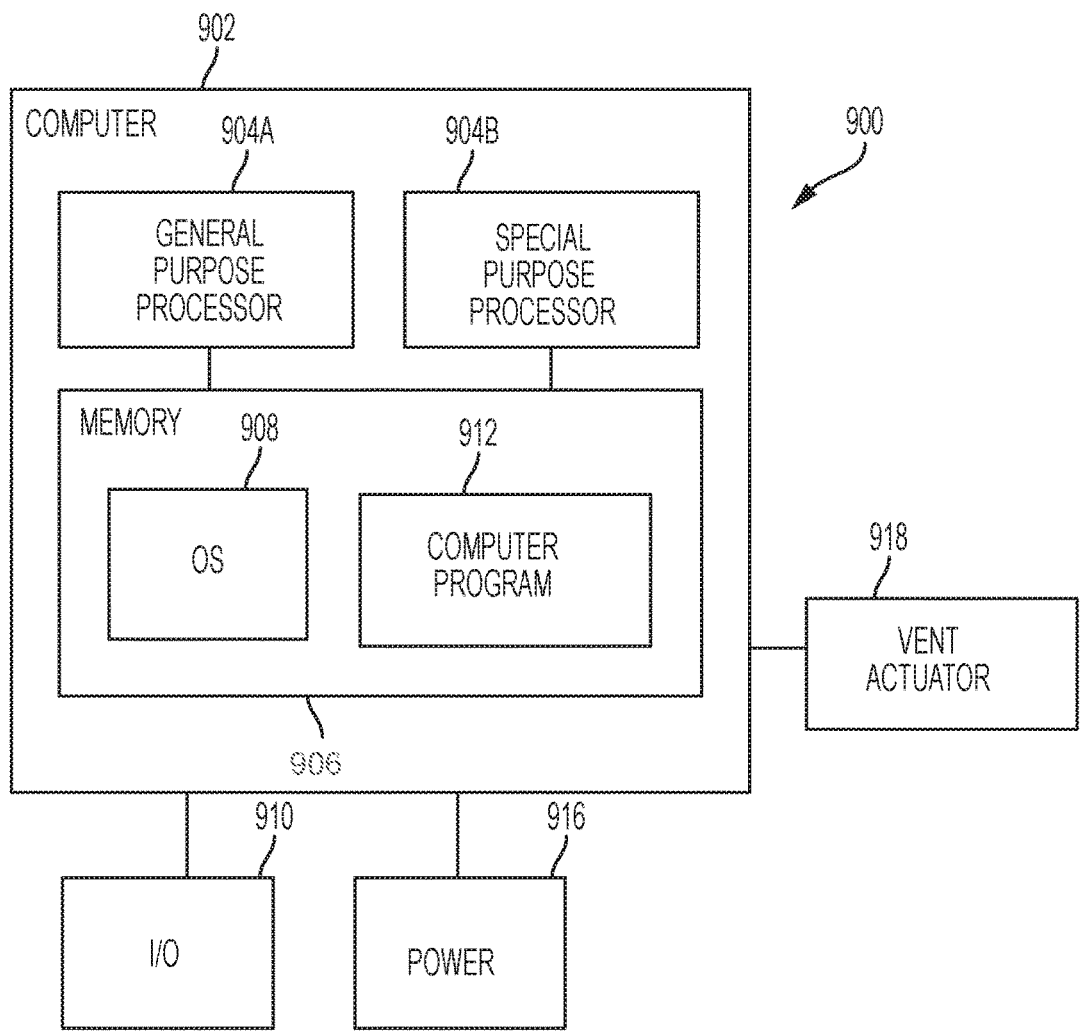
FIG. 9 illustrates an exemplary hardware environment for activating the ventilation system.

FIG. 9 illustrates an exemplary system 900 that could be used to implement processing elements needed to actuate an actuator 612, 918 for one or more of the ventilation systems comprising vents 204, 304, 404, 500, 610a disclosed herein. The computer system is typically located on the aircraft e.g., but not limited to, in a box mounted on the engine fan case or inside the aircraft.

The computer 902 comprises a processor 904 (general purpose processor 904A and special purpose processor 904B) and a memory, such as random access memory (RAM) 906. Generally, the computer 902 operates under control of an operating system 908 stored in the memory 906, and interfaces with the user/other computers to accept inputs and commands (e.g., analog or digital signals) and to present results through an input/output (I/O) module 910. The computer program application 912 accesses and manipulates data stored in the memory 906 of the computer 902. The operating system 908 and the computer program 912 are comprised of instructions which, when read and executed by the computer 902, cause the computer 902 to perform the operations herein described. In one embodiment, instructions implementing the operating system 908 and the computer program 910 are tangibly embodied in the memory 906, thereby making a computer program product or article of manufacture. As such, the terms "article of manufacture," "program storage device" and "computer program product" as used herein are intended to encompass a computer program accessible from any computer readable device or media.

In one embodiment, computer 902 comprises one or more field programmable gate arrays (FPGAs).

The computer system 900 is connected the actuator actuating the ventilation system. In one embodiment, an Electronic Engine Control (EEC) sending a digital request to the computer 902 through I/O 910 to actuate the ventilation system. In another embodiment, the EEC unit sends a digital request to the controller 902 through I/O 910 to control current and/or voltage applied to the ventilation actuators, so as to control opening of the barriers. In yet another embodiment, the computer provides status to the EEC so that the controller and/or the EEC monitor system monitor temperature in the housing.

In one embodiment, the I/O 910 receives signal from an engine shut off switch after engine 200 shut down, thereby activating the ventilation system so as to activate cooling of the rotor shaft. In one example, the ventilation system is actuated soon/immediately after engine shut down so as to minimize aircraft departure delays caused by mitigating rotor shaft bow.

FIG. 9 further illustrates a power source 916 for providing power to the system 900.

Those skilled in the art will recognize many modifications may be made to this configuration without departing from the scope of the present disclosure. For example, those skilled in the art will recognize that any combination of the above components, or any number of different components, peripherals, and other devices, may be used.

Figure 10A:
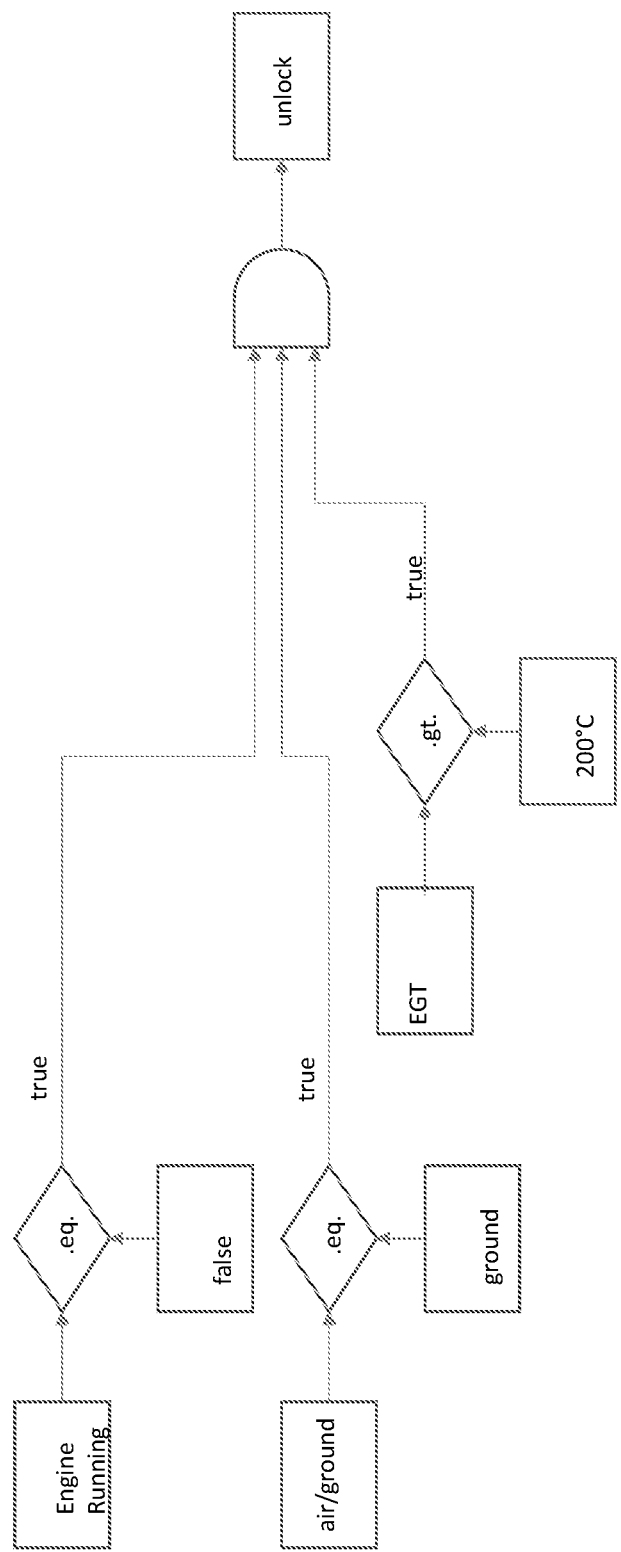
FIG. 10A illustrates vent interlock logic that can be used in one embodiment to activate the vents to reduce or prevent rotor bowing, based on air/ground and engine running logic.

FIG. 10A illustrates vent interlock logic that can be used in one embodiment to activate the vents to mitigate for the bowed rotor, based on air/ground and engine running logic. When engine running is equal (eq.) to false and the aircraft is on the ground (air/ground eq. ground is true) and the engine temperature (EGT) is greater than (gt) a threshold (e.g., 200 degrees Celsius), then the vents 606, 304, 500 are unlocked and activated to prevent or reduce bowing of the rotor shaft 122. In one or more embodiments, vents 304, 500, 304, 606 are located along the inner wall of the fan duct, above the HP compressor 108, and/or above the turbine 110, on the top and/or the bottom. In one example, one vent 304, 500, 606 is over the compressor 108 and one vent 304, 500, 304, 606 is over the turbine 110 (placement may be optimized for each application).

Figure 10B:
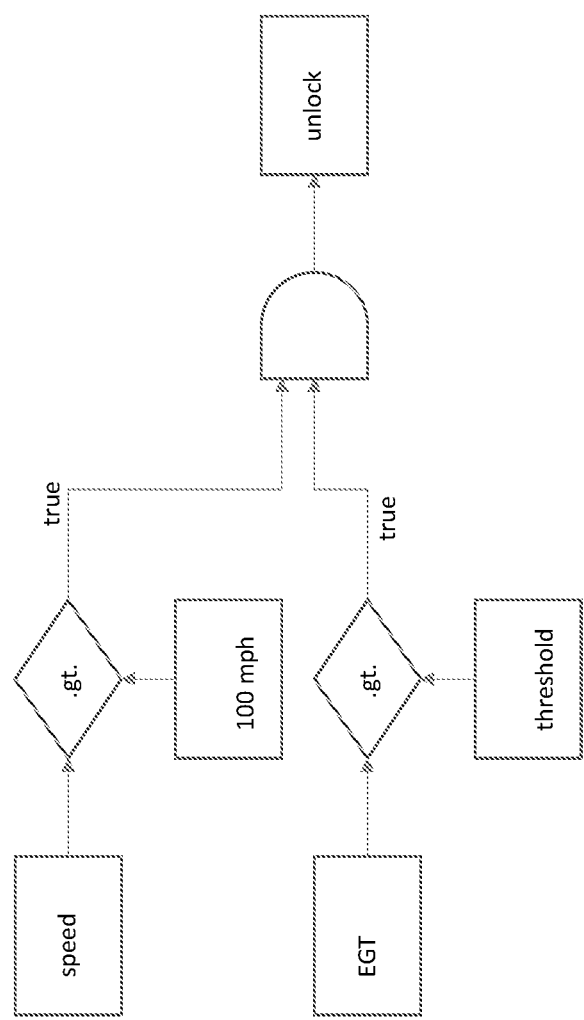
FIG. 10B illustrates vent interlock logic that can be used in one embodiment to activate the active radiator grille shutter based on car speed and engine temperature.

FIG. 10B illustrates vent interlock logic that can be used in one embodiment to activate the active radiator grille shutter based on car speed and engine temperature. When the car speed is above (e.g., gt than) a threshold (e.g., 100 mph) and the engine temperature (EGT) is greater than (gt) a threshold (e.g., 200 degrees Celsius), then the vents 606 in the active radiator grille 636 of FIG. 6H are activated to cool the engine.

In one more embodiments, vent interlocks are not used for battery containment or E/E bay cooling (the SMA could be trained to automatically open the vent 606 upon exceeding a temperature threshold).

CONCLUSION

This concludes the description of the preferred embodiments of the present disclosure. The foregoing description of the preferred embodiment has been presented for the purposes of illustration and description. It is not intended to be exhaustive or to limit the disclosure to the precise form disclosed. Many modifications and variations are possible in light of the above teaching. It is intended that the scope of rights be limited not by this detailed description, but rather by the claims appended hereto.

What is claimed is:

1. An apparatus, comprising:
a housing;
a vent disposed in the housing; and
a shape-memory alloy (SMA) element coupled to the vent and configured such that when a temperature in the housing exceeds a threshold, the SMA element changes shape to actuate the vent;
wherein air flows through the vent to cool an inside of the housing when the vent is actuated; and
wherein:
the housing is an engine pylon, an electronics and equipment bay on an aircraft, or a battery container, or
the apparatus is a nacelle in combination with a gas turbine and the housing is the nacelle, or
the housing includes a grille covering a portion of an automobile engine.

2. The apparatus of claim 1, wherein the housing is the engine pylon, the electronics and equipment bay, or the battery container.

3. The apparatus of claim 1, wherein:
the apparatus is the nacelle in combination with the gas turbine engine, and
the housing is the nacelle.

4. The apparatus of claim 1, wherein the vent is modular.

5. The apparatus of claim 1, wherein the housing is the grille covering a portion of the automobile engine.

6. In combination, an engine housing and a gas turbine engine comprising a rotor shaft, the engine housing comprising:
a wall; and
a plurality of vents disposed in the wall so that airflow through the vents reduces or prevents thermal bowing of the rotor shaft caused by a temperature gradient across the rotor shaft.

7. The combination of claim 6, further comprising a fan attached to the wall and coupled to at least one of the vents.

8. The combination of claim 7, wherein the fan is disposed inside the at least one of the vents.

9. The combination of claim 6, further comprising a plurality of fans attached to the wall and coupled to the vents, wherein:
at least one of the fans is disposed to direct flow of air from inside the engine housing to an outside of the engine housing through at least one of the vents in an upper region of the engine housing, and
at least one of the fans is disposed to direct flow of air from the outside the engine housing to the inside the engine housing through at least one of the vents in a lower region of the engine housing.

10. The combination of claim 6, further comprising a plurality of fans attached to the wall and coupled to the vents, wherein:
at least one of the fans is disposed to direct air from an inside the engine housing to an outside of the engine housing through at least one of the vents in a lower region of the engine housing, and
at least one of the fans is disposed to direct air from the outside of the engine housing to the inside the engine housing through at least one of the vents in an upper region of the engine housing.

11. The combination of claim 6, further comprising a plurality of fans attached to the wall and coupled to the vents, wherein the fans are disposed to direct air from an outside of the engine housing to an inside the engine housing and push hotter air out a rear of the gas turbine engine.

12. The combination of claim 6, further comprising a plurality of fans attached to the wall and coupled to the vents, wherein the fans are disposed to swirl air around the engine housing and push hotter air out a rear of the engine.

13. The combination of claim 6, further comprising at least one of the vents in an upper half of the engine housing and at least one of the vents in a lower half of the engine housing.

14. The combination of claim 6, further comprising barriers pivotally attached to the wall so as to swing open or closed under gravity, thereby sealing or unsealing the vents.

15. The combination of claim 6, further comprising barriers pivotally attached to the wall so as to swing closed and seal each the vents upon pressure from airflow outside the engine housing when the airflow is moving above a threshold velocity.

16. The combination of claim 6, further comprising barriers pivotally attached to the wall so as to swing open or closed, thereby sealing and unsealing the vents, wherein the barrier comprises a shape-memory alloy (SMA) element.

17. A method of cooling a rotor shaft in an aircraft engine assembly, comprising:
re-distributing flow of air trapped in an engine housing, when the rotor shaft in the engine housing is cooling down in a temperature gradient perpendicular to a longitudinal axis of the rotor shaft, thereby reducing or preventing thermal bowing of the rotor shaft in the temperature gradient.

18. The method of claim 17, further comprising providing one or more ventilation ducts in the engine housing, wherein the re-distributing comprises:
allowing flow of air into a bottom of the engine housing through at least one of the ventilation ducts and expelling hotter air out of a top of the engine housing through at least one of the ventilation ducts; and/or
allowing flow of air into a top of the engine housing through at least one of the ventilation ducts and expelling hotter air out of a bottom of the engine housing through at least one of the ventilation ducts; and/or
using the ventilation ducts to swirl cooler air around the engine housing and push hotter air out a rear of an aircraft engine assembly; and/or
allowing flow cooler air into the engine housing through the ventilation ducts so as to push hotter air out a rear of the aircraft engine assembly.

19. The method of claim 17, further comprising using fans attached to the engine housing to create convection of the air that subjects the rotor shaft to a more uniform temperature.

20. The method of claim 17, further comprising providing one or more ventilation ducts in the engine housing and one or more fans attached to the engine housing, wherein the re-distributing comprises using the fans to push or suck air through the ventilation ducts.

\* \* \* \* \*